United States Patent [19]

Atkins et al.

[11] Patent Number: 4,525,498

[45] Date of Patent: Jun. 25, 1985

[54] POLYESTER FIBER REINFORCED MOLDING COMPOUNDS

[75] Inventors: Kenneth E. Atkins, South Charleston; Robert R. Gentry, Saint Albans, both of W. Va.

[73] Assignee: Union Carbide Corporation, Danbury, Conn.

[21] Appl. No.: 569,591

[22] Filed: Jan. 12, 1984

Related U.S. Application Data

[63] Continuation-in-part of Ser. No. 194,070, Oct. 16, 1980, abandoned, which is a continuation-in-part of Ser. No. 094,949, Nov. 16, 1979, abandoned.

[51] Int. Cl.$^3$ .................. C08L 31/04; C08L 63/00; C08L 67/06
[52] U.S. Cl. .................. 523/511; 524/109; 524/529; 524/538
[58] Field of Search ............. 523/511; 524/109, 529, 524/538

[56] References Cited

U.S. PATENT DOCUMENTS

| | | | |
|---|---|---|---|
| 3,047,415 | 7/1962 | Rhodes et al. | 524/109 |
| 3,217,066 | 11/1965 | Greenspan et al. | 525/40 |
| 3,245,925 | 4/1966 | Watson | 525/111.5 |
| 3,247,283 | 4/1966 | McGary et al. | 525/524 |
| 3,455,858 | 7/1969 | Taft | 525/438 |
| 3,463,749 | 8/1969 | Taft | 525/532 |
| 3,549,586 | 12/1970 | Smith et al. | 523/511 |
| 3,644,568 | 2/1972 | Tilley et al. | 525/445 |
| 3,660,371 | 5/1972 | Johnson et al. | 525/170 |
| 3,663,500 | 5/1972 | Crabtree et al. | 523/466 |
| 3,668,178 | 6/1972 | Comstock et al. | 523/514 |
| 3,810,863 | 5/1974 | Hatton et al. | 525/170 |
| 3,812,073 | 5/1974 | Ito et al. | 523/511 |
| 3,838,110 | 9/1974 | Villa | 526/248 |
| 3,883,612 | 5/1975 | Pratt | 525/170 |
| 3,886,104 | 5/1975 | Borman et al. | 524/114 |
| 3,887,515 | 6/1975 | Pennington et al. | 523/434 |
| 3,909,485 | 9/1975 | Hongo et al. | 523/460 |
| 3,933,757 | 1/1976 | Pratt et al. | 525/445 |
| 3,997,627 | 12/1976 | Ichimura et al. | 526/320 |
| 4,010,219 | 3/1977 | Aoyama et al. | 524/114 |
| 4,018,848 | 4/1977 | Khanna | 525/110 |
| 4,032,593 | 6/1977 | Samejima | 525/438 |
| 4,045,510 | 8/1977 | Login | 525/430 |
| 4,048,257 | 9/1977 | Stevenson | 525/170 |
| 4,049,749 | 9/1977 | Thorpe | 525/170 |
| 4,055,606 | 10/1977 | Prevorsek et al. | 428/416 |
| 4,073,827 | 2/1978 | Okasaka et al. | 428/413 |
| 4,076,765 | 2/1978 | Nakahara et al. | 525/507 |
| 4,076,767 | 2/1978 | Samejima | 525/41 |
| 4,079,024 | 3/1978 | Hess et al. | 523/509 |
| 4,087,479 | 5/1978 | Toyota et al. | 525/438 |
| 4,100,221 | 7/1978 | Passalenti et al. | 523/457 |
| 4,100,229 | 7/1978 | Schwartz | 523/511 |
| 4,101,604 | 7/1978 | Rowe | 523/513 |
| 4,146,453 | 3/1979 | Via | 523/511 |
| 4,147,737 | 4/1979 | Sein | 525/438 |
| 4,413,073 | 11/1983 | Gibson et al. | 523/511 |

*Primary Examiner*—Ronald W. Griffin
*Attorney, Agent, or Firm*—Steven T. Trinker

[57] ABSTRACT

Polyester fiber reinforced molding compounds containing low profile additives afford moldings with improved surface appearance by the addition of epoxy compounds essentially free of reactive unsaturation.

23 Claims, No Drawings

POLYESTER FIBER REINFORCED MOLDING COMPOUNDS

This application is a continuation-in-part of U.S. patent application Ser. No. 194,070, filed Oct. 16, 1980, now abandoned which is a continuation-in-part of U.S. patent application Ser. No. 094,949, filed Nov. 16, 1979, now abandoned.

BRIEF SUMMARY OF THE INVENTION

Technical Field

This invention pertains to low shrink thermosetting polyester molding compositions and more particularly to those compositions containing low profile additives and epoxy compounds essentially free of reactive unsaturation.

BACKGROUND OF THE INVENTION

Unsaturated polyester resins have been employed commercially in various fiber reinforced fabrication systems including among others matched metal-die compression, transfer, and injection molding. These systems involve curing a formulated compound at high temperatures and pressures in hardened and chrome-plated molds. These methods provide the highest volume and highest part uniformity of any thermoset molding technique.

A technical improvement that has made a significant contribution to commercial thermosetting molding technology is the use of low profile additives to reduce shrinkage during the curing reaction, and to thereby improve dimensional stability and surface smoothness. Low profile additives are, in general, thermoplastic polymers, such as, vinyl acetate polymers, polystyrene, acrylic polymers, and polycaprolactones. There are a number of theories that seek to explain the low profile or anti-shrinkage action of these polymers, but the one that seems to best explain the phenomenon is the following:

The low profile additive is at least partly soluble in the uncured thermosetting resin such as a polyester/styrene solution. As the polyester/styrene mixture crosslinks, the thermoplastic polymer becomes incompatible or less soluble and at least partly comes out of solution. This action causes a volume expansion that compensates for the shrinkage that occurs when the polyester/styrene mixture crosslinks.

A major advance in commercial thermosetting molding technology was the introduction several years ago of chemically thickened systems. Chemical thickening is always employed in sheet molding compounds ("SMC"), and is increasingly being used in bulk molding compounds ("BMC"). In such systems, an alkaline material such as magnesium oxide or magnesium hydroxide is added to, for example, an uncured polyester along with fillers, glass fiber, and other standard materials. The alkaline material interacts with residual acidity in the polyester to build viscosity. The thickened system is relatively tackfree and easy to handle, and the high viscosity carries the glass fiber reinforcement to the extremities of the mold during crosslinking of the system. Thus, the use of thickened systems has made a major contribution to the commercial expansion of polyester molding.

While low profile unsaturated polyester fiber glass reinforced molding systems have gained wide acceptance in the transportation industry because of good surface appearance, dimensional stability, physical properties, productions and assembly costs and weight savings versus metal, there is still a need for further improvement in reducing rippling and waviness in surface sensitive areas that are molded down a "draw" area of the mold.

U.S. Pat. No. 3,997,627 (Ichimura et al.) describes an unsaturated polyester composition for molding compounds consisting essentially of (1) 20 to 70 parts by weight of an unsaturated polyester obtained by condensing an acid component comprising a major amount of an alpha, beta-ethylenically unsaturated dicarboxylic acid with a polyol, (2) 25 to 75 parts by weight of a vinyl monomer copolymerizable with said unsaturated polyester, (3) 1 to 25 parts by weight of a thermoplastic polymer, and (4) at least one member selected from the group consisting of hydroxyl-containing vinyl monomers and epoxy-containing vinyl monomers in a ratio of 1 to 40 parts by weight to 100 parts by weight of said unsaturated polyester (to form 100 parts by weight of the composition). The composition may be molded and cured to yield articles which provide good adhesion to surface coatings and are susceptible of decorative finishes.

Epoxy-containing vinyl monomers suitable for use in Ichimura et al. are described in column 4, lines 34–41. The monomers include the reaction products of alpha, beta-ethylenically unsaturated carboxylic acids and epichlorohydrin, and monoesterification products of diepoxy compounds with the unsaturated carboxylic acids. Preferred monomers include glycidyl acrylate, glycidyl methacrylate, allyl glycidyl ether, and methallyl glycidyl ether. Ichimura et al. discloses only epoxy-containing vinyl monomers having reactive unsaturation for use in the polyester molding compositions therein.

U.S. patent application Ser. No. 194,069, filed in the name of Kenneth E. Atkins on Oct. 16, 1980 and titled "Improved Polyester Moldings", described a polyester molding composition comprising:

(a) a polyester resin comprising the reaction product of an olefinically unsaturated dicarboxylic acid or anhydride and a polyol;

(b) an olefinically unsaturated monomer that is copolymerizable with said polyester resin;

(c) a thermoplastic polymer low profile additive to control shrinkage; and (d) an effective amount of a second crosslinkable vinyl monomer having a reactivity ratio ($r_1$) with styrene of greater than 1. The addition of component (d) in said U.S. patent application Ser. No. 194,069 is stated to result in moldings with improved surface characteristics.

DISCLOSURE OF THE INVENTION

In accordance with the present invention, there is provided means for making low shrink curable molding compositions having improved surface appearance. This is accomplished by a composition comprising:

(a) a thermosetting polyester resin;

(b) an olefinically unsaturated monomer that is copolymerizable with polyester resins;

(c) a thermoplastic low profile additive for shrinkage control; and (d) a thermosetting epoxy resin containing at least one 1, 2-epoxy group per molecule, said epoxy resin being essentially free of reactive unsaturation.

DETAILED DESCRIPTION

Thermosetting polyester resins suitable for use in accordance with the invention are polyester resins that are reaction products of a dicarboxylic acid or anhydride, with a polyhydric alcohol. The dicarboxylic acids or anhydrides that are employed to produce the polyester, either singly or in combination, must include those that contain olefinic unsaturation, preferably wherein the olefinic unsaturation is alpha, beta- to at least one of the carboxylic acid groups. Such acids include maleic acid or anhydride, fumaric acid, methyl maleic acid, and itaconic acid. Maleic acid or anhydride and fumaric acid are the most widely used commercially.

In addition to the olefinically unsaturated acid or anhydride, saturated and/or aromatic dicarboxylic acids or anhydrides can also be employed in producing the polyester. Such acids include phthalic acid or anhydride, terephthalic acid, hexahydrophthalic acid or anhydride, adipic acid, isophthalic acid, and "dimer" acid (i.e., dimerized fatty acids).

A polyol is also employed to produce the polyester. Such polyols include ethylene glycol, diethylene glycol, propylene glycol, dipropylene glycol, butylene glycols, neopentyl glycol, glycerol and 1,1,1-trimethylolpropane. As a rule, not more than about 20 mole percent of the polyol will be a triol, with the remainder being one or more diols.

As is known in the art, polyesters that are employed in thickened molding compositions must contain residual acidity in order to enter into the thickening reaction. The nature and production of the polyesters used in such applications, such as dicyclopentadiene modified resins, are known in the art and are described in U.S. Pat. No. 3,933,757 and U.S. Pat. No. 3,883,612 incorporated herein by reference.

Vinyl ester resins that have been advantageously employed in both bulk molding compounds (BMC) and sheet molding compounds (SMC) are resins wherein the secondary hydroxyl group formed by the interaction of an epoxide group with a carboxylic acid group has been reacted with a dicarboxylic acid anhydride to produce pendant carboxylic acid groups. A variety of saturated and unsaturated anhydrides similar to those described as useful in preparing polyester resins may be used in proportions of at least about 0.1 mole of anhydride per equivalent of hydroxyl group up to an amount sufficient to react with each hydroxyl.

Thermosetting resins that are classified herein as vinyl ester resins, which contain the characteristic linkages and terminal polymerizable unsaturated groups, are fully disclosed in U.S. Pat. No. 3,887,515 along with the preparation of such resins and further description of these well known resins is unnecessary herein.

The curable compositions of the invention also contain a monomer that contains ethylenic unsaturation, and which is copolymerizable with the polyester and terminally unsaturated vinyl ester resins. Styrene is the preferred monomer in commercial practice today, although others can be used.

The said monomer is also employed in the resin composition for the purpose of dissolving the thermosetting resin (which is a solid at ambient temperatures, i.e., about 20° C.-25° C.) to ensure that the resin composition is a fluid. Enough monomer is employed so that the thickness or viscosity of the fluid is such that the fluid can be processed conveniently. Excessive amounts of the monomer are normally to be avoided, because such excess can have an adverse effect on properties. For instance, too much of the monomer may tend to cause embrittlement of the cured polyester. Within these guidelines, effective proportions of the monomer are normally found within the range of from about 25 to about 70, and preferably 40 to 55, weight percent, based on weight of thermosetting alkyl plus monomer, plus thermoplastic additive.

When desired a thickening agent can also be employed in the compositions of the invention. Such materials are known in the art, and include the oxides and hydroxides of the metals of Group I, II and III of the Periodic Table. Illustrative examples of thickening agents include magnesium oxide, calcium oxide, calcium hydroxide, zinc oxide, barium oxide, magnesium hydroxide, and the like, including mixtures of the same. Thickening agents are normally employed in proportions of from about 0.1 to about 6 weight percent, based upon weight of polyester resin, plus monomer, plus low profile additive.

Alternatively, a dual thickening system may be employed wherein, for example, a metallic oxide or hydroxide and polyisocyanate in amounts of polyisocyanate sufficient to react with at least thirty percent of the hydroxyl groups but not more than one hundred and five percent of the hydroxyl groups present and an amount of metallic oxide or hydroxide sufficient to react with at least thirty percent of the carboxyl groups but not more than seventy-five percent of the carboxyl groups present. Reference is made to the Belgium Pat. No. 849,135 for a description of such dual thickening systems.

An essential component of the compositions of the invention are thermoplastic low profile additives. In one aspect, the low profile additives that may be employed in the invention are thermoplastic polymers of vinyl acetate, saturated thermoplastic polyesters, and mixtures of the same. In another aspect of the invention, the low profile additive that may be employed are thermoplastic polyalkyl methacrylate polymers.

Suitable thermoplastic vinyl acetate polymer low profile additives are poly(vinyl acetate)homopolymers and thermoplastic copolymers containing at least 50 weight percent vinyl acetate. Such polymers include, for example, vinyl acetate homopolymer; carboxylated vinyl acetate polymers include copolymers of vinyl acetate and ethylenically unsaturated carboxylic acids, such as acrylic acid, methacrylic acid, maleic acid, fumaric acid, itaconic acid and the like or anhydrides such as maleic anhydride; vinyl acetate/vinyl chloride/maleic acid terpolymer, and the like. Reference is made to U.S. Pat. No. 3,718,714 to Comstock et al., and British Pat. No. 1,361,841 to Comstock et al. for descriptions of some of the suitable vinyl acetate polymer low profile additives.

The useful vinyl acetate polymer low profile additives ordinarily have molecular weights within the range of from about 10,000 to about 250,000, and preferably from about 25,000 to about 175,000. They are usually employed in proportions of from about 5 to 25, and preferably from about 9 to 16, weight percent, based on weight of polyester plus thermoplastic, plus monomer.

Suitable thermoplastic saturated polyester low profile additives are, in general, low molecular weight saturated polymers of polymerizable linear and/or cyclic esters and carboxylated saturated polymers and said polymerizable esters having at least one carboxyl group per molecule.

Polymer of linear and/or cyclic esters, including carboxylated polymers having an average of at least one carboxyl group per molecule which may be used in accordance with the present invention are those which possess a reduced viscosity of at least about 0.1, and preferably from about 0.15 to about 15 and higher. The preferred polymers of cyclic esters have a reduced viscosity of about 0.2 to about 10.

Suitable polymers are further characterized by the following basic recurring structural Unit I

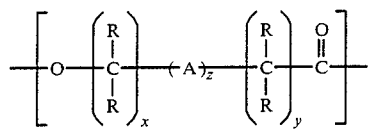

wherein each R, which can be the same or different, is hydrogen, halogen, i.e., chlorine, bromine, iodine, or fluorine, or a monovalent hydrocarbon radical generally containing a maximum of 12 carbon atoms, and preferably containing a maximum of eight carbon atoms. A is an oxy group; x is an integer having a value of 1 to 4 inclusive, y is an integer having a value of 1 to 4 inclusive, z is an integer having a value of 0 or 1, with the proviso that (a) the sum of $x+y+z$ is 4 to 6 inclusive and (b) the total number of R variables which are substituents other than hydrogen does not exceed 2.

Illustrative of suitable monovalent hydrocarbon radicals for R are the following: alkyl radicals such as methyl, ethyl, isopropyl, n-butyl, sec-butyl, t-butyl, n-hexyl, 2-ethylhexyl, n-dodecyl, chloroethyl, chloropropyl and the like; alkoxy radicals such as methoxy, ethoxy, n-propoxy, n-hexoxy, n-dodecoxy and the like; aryl radicals such as phenyl, ethyl phenyl, n-propylphenyl, n-butylphenyl and the like; aryloxy radicals such as phenoxy, n-propylphenoxy, n-butylphenoxy and the like; cycloaliphatic radicals such as cyclopentyl, cyclohexyl and the like.

In one embodiment, desirable polymers of cyclic esters are characterized by both basic recurring structural Unit I supra and basic recurring structural Unit II, as are obtained from a mixture containing a cyclic ester and a cyclic monomer such as ethylene oxide, propylene oxide and the like:

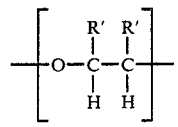

Unit II wherein each R', is as defined for R of Unit I, or in which the two R' variables together with the ethylene moiety of the oxyethylene chain of Unit II form a saturated cycloaliphatic hydrocarbon ring having from four to eight carbon atoms inclusive. It is preferred that recurring Unit II contains from two to twelve carbon atoms inclusive. The interconnection of Unit I and Unit II does not involve or result in the direct bonding of two oxy groups, i.e., —O—O—.

Particularly preferred polymers of cyclic esters are those which are characterized by the oxypentamethylenecarbonyl chain as seen in basic recurring structural Unit III

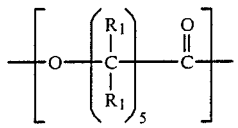

Unit III wherein each $R_1$ is hydrogen or lower alkyl, that is alkyl having a maximum of 4 carbon atoms, with the proviso that no more than three $R_1$ variables are substituents other than hydrogen.

Thermoplastic saturated polymers of linear and/or cyclic esters are well known and the carboxylated saturated esters are well known and such thermoplastic saturated polymers, and particularly polymers prepared from epsiloncaprolactones, have been advantageously employed as low profile additives. Reference, for example, is made to U.S. Pat. Nos. 3,549,586 and 3,668,178 to Comstock et al. for descriptions of thermoplastic saturated polyester low profile additives and carboxylated thermoplastic saturated polyester low profile additives prepared from cyclic esters.

The thermoplastic saturated polyester low profile additives may usually be employed in the compositions of the invention in proportions similar to those of thermoplastic vinyl acetate polymers, i.e., in proportions from about 5 to 25 weight percent, and preferably from about 10 to 20 weight percent, based on weight of polyester, plus thermoplastic polymer, plus monomer.

Also suitable in certain aspects of the invention are thermoplastic polyalkyl acrylate or methacrylate low profile additives including, for example, homopolymers of methyl methacrylate, ethyl methacrylate, butyl methacrylate, methyl acrylate, ethyl acrylate; copolymers of methyl methacrylate and lower alkyl esters of acrylic and methacrylic acids, and copolymers of methyl methacrylate with minor amounts of one or more of the following: lauroyl methacrylate, isobornyl methacrylate, acrylamide, hydroxyethyl methacrylate, styrene, 2-ethylhexyl acrylate, acrylonitrile, methacrylic acid, polystyrene, styrene copolymers, such as, styrene/butadiene copolymers, cellulose acetate butyrate, alkylene oxide polymers, urethane polymers, and the like.

Molecular weight of the alkyl acrylate or methacrylate polymers usful in the invention may vary over a wide range, from 10,000 to 1,000,000 and preferably from 25,000 to 500,000.

The thermoplastic polymer should be present in amounts ranging from 1 to 25 percent by weight, based on the weight of polyester, plus low profile additive, plus monomer, and preferably from 5 to 20 percent by weight.

An optional component of the compositions of the invention is a viscosity reducing agent. In one aspect, the invention employs, generally in combination with thermoplastic vinyl acetate polymer and thermoplastic saturated polyester low profile additives, a viscosity reducing agent which is an aliphatic monocarboxylic acid having at least 6 carbon atoms.

The aliphatic monocarboxylic acid employed usually has at least 6 carbon atoms in the chain, and is frequently a saturated or unsaturated fatty acid having from 6 to 24 or more carbon atoms in the chain. Such carboxylic acids may be caproic (hexanoic), caprylic (octanoic), capric ($C_{10}$), lauric ($C_{12}$), myristic ($C_{14}$), palmitic ($C_{16}$), palmitoleic ($C_{16}$), stearic ($C_{18}$), oleic ($C_{18}$), linoleic ($C_{18}$), linolenic ($C_{18}$), and the like acids, and the acids may be either straight chain or branched chain. Products in which mixtures of acids of the foregoing kind occur, such as tall oil acid, may be used.

The viscosity reducing agent can be present in amounts ranging from 0.4 to about 6 weight percent, and preferably from about 1 to 4 weight percent, based on the combined weight of thermosetting resin, copolymerizable monomer, and low profile additive.

The epoxy compounds of this invention can be based on aliphatic, cycloaliphatic or aromatic backbones. Thus, for example, are included the bisphenol A based epoxy resins.

One class of preferred thermosetting epoxy resins can be represented by the formula:

wherein n is an integer representing the number of repeating units and has a value of 0 to about 10 and Z is an arylene radical having 6 to about 20 carbons. The preferred arylene radical is:

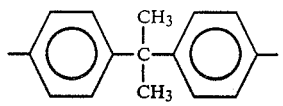

Still another preferred class of thermosetting epoxy resins are the 1,2-cycloaliphatic diepoxides. They are exemplified by the following:

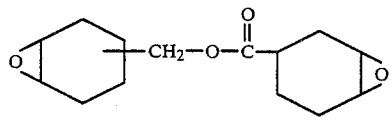

3,4-epoxycyclohexylmethyl 3,4-epoxycyclohexane carboxylate

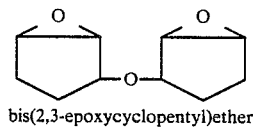

bis(2,3-epoxycyclopentyl)ether

vinyl cyclohexane dioxide

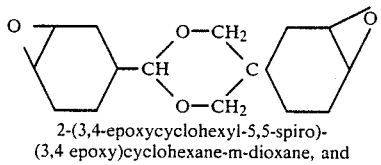

2-(3,4-epoxycyclohexyl-5,5-spiro)-
(3,4 epoxy)cyclohexane-m-dioxane, and

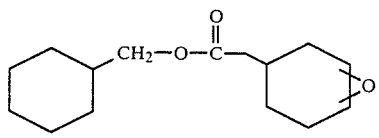

A general description of the preparation of thermosetting epoxy resins is presented in the Encyclopedia of Polymer Science and Technology, pp. 209–216, Vol. 6, Interscience Publishers, N.Y.C. 1967, which is incorporated herein by reference.

A representative example of an aliphatic epoxy compound is epoxidized polybutadiene.

The epoxy compounds employed in this invention are essentially free of reactive unsaturation. Some residual unsaturation may however be present in the epoxy compounds as normal impurity levels based on typical commercial operations. The residual unsaturation impurity levels should not be greater than about 25 weight percent, preferably not greater than about 10 weight percent, and most preferably not greater than about 5 weight percent, of the total weight of the epoxy compound. Any residual unsaturation impurities remaining in the epoxy compounds employed in this invention preferably have a reactivity ratio ($r_1$) with styrene of greater than 1, more preferably greater than 5, and most preferably greater than 20. Measuring the reactivity ratios of compounds is well known in the art as described, for example, in F. W. Billmeyer, Jr., *Textbook of Polymer Science*, Wiley-Interscience, pages 329–331.

While the amount of epoxy compound used in the practice of the invention is not narrowly critical, it is preferred to use about 1 to about 25 parts per hundred parts of polyester resin plus unsaturated monomer plus low profile additive and even more preferred about 2 to 10 parts per hundred.

The polyester molding composition may also contain one or more of the known types of conventional additives, which are employed for their known purposes in the usual amounts. The following are illustrative of such additives:

1. Polymerization initiators such as t-butyl hydroperoxide, t-butyl perbenzoate, benzoyl peroxide, cumene hydroperoxide, methyl ethyl ketone peroxide, and others known to the art. The polymerization initiator is employed in a catalytically effective amount, such as from about 0.3 to about 2 to 3 weight percent, based on the weight of the polyester plus monomer plus low profile additive:

2. Fillers such as clay, hydrated alumina, silica, calcium carbonate and others known to the art;

3. Reinforcing fillers such as glass fibers or fabrics, asbestos fibers or fabrics, various organic fibers or fabrics such as those made of polypropylene, acrylonitrile/vinyl chloride copolymer, and others known to the art;

4. Mold release agents or lubricants, such as zinc stearate, calcium stearate, and others known to the art; and 5. Rubbers or elastomers such as (a): homopolymers or copolymers of conjugated dienes having a weight average molecular weight of 30,000 to 400,000 or higher as described in U.S. Pat. No. 4,020,036. The conjugated dienes contain from 4–12 carbon atoms per molecule such as 1,3-butadiene, isoprene, and the like; (b) epihalohydrin homopolymers, a copolymer of two or more epihalohydrin monomer(s), or a copolymer of an epihalohydrin monomer(s) with an oxide monomer(s) having a number average molecular weight (Mn) which varies from about 800 to about 50,000 as described in U.S. Pat. No. 4,101,604; (c) chloroprene polymers including homopolymers of chloroprene and copolymers of chloroprene with sulfur and/or with at least one copolymerizable organic monomer wherein chloroprene constitutes at least 50 weight percent of the organic monomer make-up of the copolymer as described in U.S. Pat. No. 4,161,471; (d) hydrocarbon polymers including ethylene/propylene dipolymers and copolymers of ethylene/propylene and at least one nonconjugated diene, such as ethylene/propylene/hexadiene terpolymers and ethylene/propylene/1,4-hexadiene/norbornadiene, as described in U.S. Pat. No. 4,161,471; (e) conjugated diene butyl elastomers, such as copolymers consisting of from 85 to 99.5% by weight of a $C_4$-$C_7$ isolefin combined with 15 to 0.5% by weight of a conjugated multi-olefin having 4 to 14 carbon atoms, copolymers of isobutylene and isoprene where a major portion of the isoprene units combined therein have conjugated diene unsaturation as described in U.S. Pat. No. 4,160,759.

A preferred embodiment of the present invention involves the addition of a second crosslinkable vinyl monomer having a reactivity ratio ($r_1$) with styrene of greater than 1 to the curable molding compositions. U.S. patent application Ser. No. 237,697, filed in the name of Kenneth Earl Atkins on Feb. 24, 1981 and titled "Improved Polyester Molding Compositions", describes a composition comprising:

(a) a thermosetting polyester resin;

(b) an olefinically unsaturated monomer that is copolymerizable with the polyester resin;

(c) a thermoplastic low profile additive for shrinkage control;

(d) an effective amount of a second crosslinkable vinyl monomer having a reactivity ratio with styrene of great than 1; and (e) a thermosetting epoxy resin containing at least one 1,2-epoxy group per molecule. Compositions containing both a second crosslinkable vinyl monomer having a reactivity ratio ($r_1$) with styrene of greater than 1 and a thermosetting epoxy resin containing at least one 1,2-epoxy group per molecule results in moldings having improved surface appearance as compared to those compositions containing either of said additives.

All parts and percentages are by weight unless otherwise specified.

EXPERIMENTAL SECTION

General Procedure for Preparation of Bulk Molding Compound (BMC) Formulations All the liquid components were weighed individually into a Hobart mixing pan placed on a Toledo balance. The pan was attached to a Model C-100 Hobart mixer (in a hood). The agitator was started at slow speed, then increased to medium speed to completely mix the liquids over a period of 3-5 minutes. The agitator was then stopped and the internal mold release agent and/or fatty acid was next added to the liquid from an ice cream carton. The Hobart mixer was restarted and the mold release agent mixed with the liquid until it was completely wet out. The filler was next added to the pan contents (agitator off) then mixed, using medium to high speed, until a consistent paste was obtained. The mixer was again stopped and the weighed amount of thickening agent was mixed into the paste over a period of 2-3 minutes, the mixer was again stopped and ~175 grams of the paste were removed from the pan (using a large spatula) and transferred to a wide-mouthed 4 oz. bottle. This paste sample was stored in the capped bottle at room temperature and the viscosity was measured periodically using a Model HBT 5X Brookfield Synchro-Lectric Viscometer on a Helipath Stand.

After removal of the paste sample, the contents were reweighed and styrene loss made up, the chopped glass fibers were added slowly (from an ice cream carton) to the pan with the mixer running on slow speed. The mixer was run for ~30 seconds after all the glass was in the paste. This short time gave glass wet out without glass degradation. The pan was then removed from the mixer and separate portions of the BMC mix of ~450 grams each were removed using spatulas and transferred to aluminum foil lying on a balance pan (balance in the hood). The mix was tightly wrapped in the aluminum foil (to prevent loss of styrene via evaporation) and stored at room temperature until the viscosity of the retained paste sample reached molding viscosity. The weight of the BMC added to the foil varies with the molding application.

General Procedures for Preparation of Sheet Molding Compound (SMC) Formulations All the liquid components were weighed individually into a 5 gallon open top container placed on a Toledo balance. The contents of the container were the mixed (in a hood) with a high speed Cowles type dissolver. The agitator was started at a slow speed, then increased to medium speed to completely mix the liquids over a period of 2-3 minutes. The mold release agent and/or fatty acid was next added to the liquids from an ice cream carton and mixed until completely dispersed. The filler was next added gradually from a tared container until a consistent paste was obtained and the contents were then further mixed to a minimum temperature of 90° F. The thickener was next mixed into the paste over a period of 2-3 minutes, the mixer was stopped and ~175 grams of the paste was removed from the container and transferred to a wide-mouthed 4 oz. bottle. The paste sample was stored in the capped bottle at room temperature and the viscosity measured periodically using a Model HBT 5X Brookfield Synchro-Lectric Viscometer on a Helipath Stand.

The balance of the paste is next added to the doctor boxes on the SMC machine where it is further combined with fiber glass (~1" fibers). The sheet molding compound (SMC) is then allowed to mature to molding viscosity and then molded into the desired article.

MOLDING FACILITIES

12"×12"×⅛" test panels

Flat panels for MCR surface evaluation are molded on a 75 TON Queens Hydraulic press. The press contains a matched dye set of 12"×12" chrome plated molds. The female cavity is installed in the bottom and the male portion is at the top. Both molds are electrically heated and are controlled on separate circuits so that the molds can be operated at different temperatures. For our molding the top and bottom temperature was 300° F. The molding pressure which can be varied from 0-75 TON was run at maximum pressure. The molds do not contain ejector pins; therefore, the molded panel is removed with a rubber suction cup and the use of a stream of air. The panels are laid on a flat surface, weighted to keep them flat and allowed to cool overnight. The molded panel is measured with a micro caliper from corner to corner in all four directions to determine shrinkage which is an average of the four readings.

These panels are also used for surface smoothness determinations with the Bendix Profilometer. The lower the MCR number the smoother the surface.

Hood Scoops

Hood Scoops designed like miniature automobile hoods and containing a number of ribs and bosses of varying sizes was used to determine "sink", surface smoothness and overall moldability of sheet molding compound formulations containing surface improvers. The hood scoop contains a large triangular boss (~1.9" base, ~0.38" high) and 3 circular bosses (~0.4", ~0.9", ~1.4" diameter). It also contains a number of ribs of varying thickness and with different lead in radii.

Visual observations of these hood scoops as molded and after painting with a gloss black paint enables one to compare "sink" over the ribs and bosses, craze cracking, surface smoothness, glass pattern, laking and overall moldability. The hood scoop mold is installed in a 200 Ton Lawton hydraulic press. The molds contains ejector pins for release of the molded part and are heated with circulating oil. The male core is installed in the bottom of the press and the female cavity at the top. Temperatures of the two molds are controlled separately. Pressure of the press can be varied up to 200 Ton with variable time cycles so that the same part can be molded at several pressures. The speed at which the press closes can also be varied as well as the cure cycle for the molded part. All of these were varied during the molding of SMC formulations containing the surface improvers. Placement of the change pattern on the male core mold was also varied. The molded hood scoop was allowed to cool and was then evaluated.

Transfer Molding Press—Tree Mold

The molding press used is a 100 ton hydraulic press with an 18"×12" platen area. The press contains a tree mold. The tree mold has a number of cavities of varying length, shapes, and thickness. In molding the part a 180 gram charge of sheet molding compound (SMC) or bulk molding compound (BMC) is added to the ram port. The ram piston which has an adjustable pressure range of 0–2000 psi then pushes the charge into the tree mold cavities where it is cured. The gate sizes going into each cavity is 64 mm while the feed lines are approximately 126 mm.

DESCRIPTION OF MATERIALS

Freeman Stypol 2955. An unsaturated polyester resin from Freeman Chemical Company which is a high reactivity isophthalic acid modified resin containing approximately 35 weight percent of styrene monomer.

Bakelite LP-40A. A product of Union Carbide Corporation which is a copolymer of vinyl acetate and acrylic acid (40 weight percent) dissolved in styrene (60 weight percent).

Snowflake. A calcium carbonate filler sold by Thompson-Weimann, Inc. having a mean particle size of 5 microns.

TBPB. Tert-butylperbenzoate.

Modifier M. A 33 weight percent dispersion of magnesium oxide in an unsaturated polyester carrier vehicle sold by USS Chemicals/Polyester Unit.

NR-3929. A high reactivity isophthalic acid modified unsaturated polyester resin containing approximately 35 weight percent of styrene and sold by Rockwell International.

PBQ. Parabenzoquinone.

PDO. A 50% dispersion of tert-butylperoctoate in dioctyl phthalate sold by the Lucidol Division of Penwalt Corp.

BAKELITE VR-3. A mixture of commercial fatty acids sold by Union Carbide Corporation.

JM 308. A sized fiberglass reinforcement of ¼" length sold by Johns Manville Corp.

CM-2015. A black pigment dispersion provided by Plasticolors, Inc.

BAKELITE LP-85. A 33 weight percent solution of poly(vinyl acetate) in styrene sold by the Union Carbide Corporation.

P-701. A 33 weight percent solution in styrene of a methyl methacrylate based thermoplastic polymer sold by Rohm and Haas.

NR-3529. An unsaturated polyester resin made by the condensation of 1.0 mole of maleic anhydride and 1.1 moles of propylene glycol and containing approximately 33 weight percent of styrene and manufactured by Rockwell International.

MR-13031. A highly reactive unsaturated polyester resin believed to be ortho-phthalic anhydride modified containing approximately 40 weight percent of styrene sold by USS Chemicals Polyester Unit.

USS-13047. A highly reactive unsaturated polyester resin commercially available from USS Chemicals Polyester Unit.

OCF-951. A fiberglass roving chopped to desired length on the sheet molding compound machine and sold by Owens Corning Fiberglass Corp.

BAKELITE LP-100 Part B. A proprietary anionic surface active agent sold by Union Carbide Corporation.

Camel Wite. A finely divided calcium carbonate filler of average diameter size of 2.5 microns supplied by H. T. Campbell.

PDI 1803. A black pigment dispersion sold by Pigment Dispersions, Inc.

PG-9089. A thickener dispersion containing a ratio of 3.75 parts magnesium hydroxide and 1.0 parts of Ca-(OH)$_2$ at approximately 28 weight percent solids supplied by Plasticolors, Inc.

Merck Marinco H. A grade of magnesium hydroxide supplied by Merck and Company.

Derakane 786. A commercial styrene solution of a vinyl ester resin sold by Dow.

Derakane 750. A styrene solution of a polystyrene low profile additive.

BAKELITE LP-60. A 40 weight percent solution in styrene of a phthalic anhydride capped poly(caprolactone)polymer sold by Union Carbide.

BAKELITE LP-100. A 40 weight percent solution in styrene of a proprietary vinyl acetate based polymer sold by Union Carbide.

METHOD OF SHRINKAGE MEASUREMENT

A 12"×12"×⅛" flat panel is molded in a highly polished chrome plated matched metal die mold in a 75 TON Queens Hydralic press. The exact dimensions of the four sides of this mold are measured to the ten-thousandths of an inch at room temperature. The exact length of the four sides of the flat molded panel is also determined to the ten thousandths of an inch. These measurements are substituted into the equation below.

$$\frac{a-b}{a} = \text{inch/inch shrinkage}$$

inch/inch shrinkage × 1000 = mils/inch shrinkage.

a = the sum of the lengths of the four sides of the mold.

b = the sum of the lengths of the four sides of the molded panel.

Since shrinkage control is normally reasonably indicative of the ability of a system to provide good surface smoothness characteristics, the use of the epoxides were examined in a "critical shrinkage control" formula used for screening either polyester resins or thermoplastic efectiveness. This system uses fairly standard resin, low profile additive and filler levels with reduced fiber glass reinforcement. The basic formula employed is presented in Table I. The structures of the epoxy compounds employed are shown in Table II and the results of the molding experiments are shown in Table III. All of the epoxide structures employed gave better shrinkage control than the control formula.

In all of the Tables presented herein the ingredients are given as parts by weight with the exception of the fiberglass reinforcement which is listed as weight % contained in the total molding compound.

A "critical shrinkage control" formula based on an acrylic thermoplastic (ROHM and HAAS PARAPLEX P-701) was also run to screen the effect of epoxide. This formulation is shown in Table IV along with the molding results. In these experiments only the AROFLINT 607 gave reduced shrinkage.

A similar formula using a vinyl ester resin (DOW DERAKANE 786) and a styrne-based thermoplastic (DOW 750) was also examined using epoxy compounds. The formulation and results are presented in Table V.

In order to confirm the improved shrinkage control observed with bulk molding compound compositions, several sheet molding compound runs were made and evaluated in test molds. The formulations for these runs are delineated in Table VI. The test molds for these experiments are described above.

TABLE I
BULK MOLDING COMPOUND
CRITICAL SHRINK
CONTROL FORMULA

|  | 1 | 2 | 3 |
|---|---|---|---|
| Unsaturated Polyester Resin NR-3929 | 55 | 52.5 | 49.5 |
| UCC - LP-40A | 40 | — | — |
| Styrene | 5 | — | — |
| Epoxy Compound | — | 2.75 | 5.5 |
| Snowflake | 150 | — | — |
| TBPB | 0.5 | — | — |
| PDO (50%) | 1.0 | — | — |
| Zinc Stearate | 2 | — | — |
| BAKELITE VR-3 | 2 | — | — |
| Modifier M (33% MgO dis-person - USS Polyester) | 3.0 | — | — |
| ¼" Fiberglass (Wt. %) | 10 | — | — |
| Molding Viscosity approximately 20,000,000 cps | | | |
| Molding Conditions: 300° F./2 minutes/1000 psi | | | |

TABLE II

STRUCTURES OF EPOXY COMPOUNDS

| Commercial Name (Supplier) | Structure or Description | Epoxide No. (Eq. Wt.) | Functionality |
|---|---|---|---|
| ERL-4221 (UCC) | 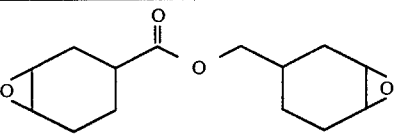 | 131–143 | 2 |
| ERL-4234 (UCC) | 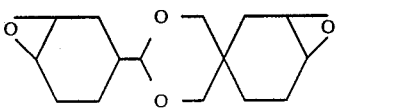 | 133–154 | 2 |
| ERL-4299 (UCC) | 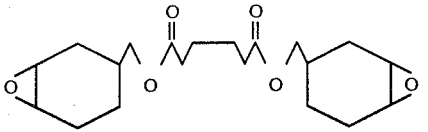 | 190–210 | 2 |
| Epon-828 (Shell) | 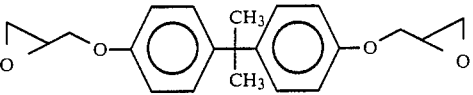 | 185–192 | 2 |
| EP-1404 | 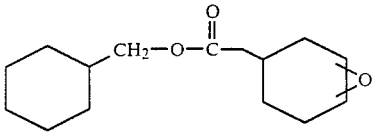 | | |
| Aroflint 607 (Ashland) | Epoxidized Pentaerythritol Tetratallate | (~280) | (~4.7) |
| FLEXOL Plasticizer EPO (UCC) | Epoxidized Soy Bean Oil | (~230) | (~4.4) |
| FLEXOL Plasticizer EP-8 (UCC) | Octyl Epoxytallate | (~320) | (~1.3) |
| FLEXOL Plasticizer | Epoxidized Linseed Oil | (~180) | (~5.6) |

TABLE II-continued
STRUCTURES OF EPOXY COMPOUNDS

| Commercial Name (Supplier) | Structure or Description | Epoxide No. (Eq. Wt.) | Functionality |
|---|---|---|---|
| LOE (UCC) | | | |

TABLE III
RESULTS OF MOLDING EXPERIMENTS USING THE FORMULATION OF TABLE I
SHRINKAGE (Mils/Inch)

| | Amount of Epoxy Compound | | |
|---|---|---|---|
| Expoxy Compound | 0.0 | 2.75 | 5.5 |
| None | 0.88 | — | — |
| UCC-ERL-4221 | | 0.48 | 0.25 |
| UCC ERL-4234 | | 0.25 | 0.44 |
| UCC ERL-4299 | | 0.35 | 0.00 |
| Shell Epon-828 | | 0.00 | 0.19 |
| Ashland Aroflint-607 | | 0.17 | 0.00 |
| UCC FLEXOL EPO | | 0.16 | 0.00 |
| UCC FLEXOL EP-8 | | 0.17 | +0.20 |
| UCC FLEXOL LOE | | 0.19 | 0.00 |

+designation indicates expansion

TABLE IV
CRITICAL SHRINKAGE FORMULA EPOXY COMPOUNDS WITH ACRYLIC THERMOPLASTIC

| Formula | pbw |
|---|---|
| Unsaturated Polyester NR-3529 | 60 |
| Rohm & Haas P-701 | 40 |
| Epoxy Compounds | Varied |
| Snowflake | 150 |
| TBPB | 1.0 |
| Zinc Stearate | 4 |
| Modifier M (33% MgO Dispersion - USS Polyester) | 2.5 |
| ¼" Fiberglass (Wt. %) | 10 |

| | Shrinkage (Mils/Inch) Amount of Epoxy Compound | |
|---|---|---|
| Epoxy Compound | 2.75 | 5.5 |
| None | 1.9 | — |
| UCC ERL-4221 | 1.9 | 1.9 |
| UCC ERL-4234 | 1.9 | 2.0 |
| Shell Epon-828 | 2.0 | 2.0 |
| Ashland Aroflint-607 | 1.4 | 1.4 |

TABLE V
CRITICAL SHRINKAGE CONTROL FORMULA VINYL ESTER SYSTEM WITH EPOXY COMPOUNDS

| | 1 | 2 | 3 | 4 |
|---|---|---|---|---|
| Derakane 786 | 63 | 63 | 63 | 63 |
| Derakane 750 | 37 | 37 | 37 | 37 |
| Snowflake | 150 | 150 | 150 | 150 |
| ERL-4221 | — | 3 | — | — |
| Epon-828 | — | — | 3 | — |
| FLEXOL LOE | — | — | — | 3 |
| Zinc Stearate | 4 | 4 | 4 | 4 |
| TBPB | 1.5 | 1.5 | 1.5 | 1.5 |
| Modifier M | 4.0 | 4.0 | 4.0 | 4.0 |
| ¼" Glass Fibers (Wt. %) | 10 | 10 | 10 | 10 |
| Shrinkage (mils/inch) | 1.25 | 1.49 | 1.13 | 1.21 |

TABLE VI
SMC FORMULATION FOR THE EVALUATION OF EPOXY COMPOUNDS

| | 1 | 2 | 3 |
|---|---|---|---|
| Rockwell NR-3929[1] | 55 | 52.25 | 49.5 |
| UCC LP-40A | 40 | 40 | 40 |
| Styrene | 5 | 5 | 5 |
| Epoxy Compound | — | 2.75 | 5.5 |
| Snowflake | 150 | 150 | 150 |
| Water | 0.05 | 0.05 | 0.05 |
| TBPB | 0.5 | 0.5 | 0.5 |
| PDO (50%) | 2 | 2 | 2 |
| Zinc Stearate | 2 | 2 | 2 |
| BAKELITE Viscosity Reducer VR-3 | 2 | 2 | 2 |
| Modifier M[1] | 3.0 | 3.0 | 3.0 |
| OCF-951 (1" Fibers) Wt. % | 26-28 | 26-28 | 26-28 |

[1]100 pm of parbenzequinone added

Shrinkage control is generally improved by the inclusion of various epoxy compounds in these compositions. This was demonstrated by numerous experiments included in Tables I-VI exemplified by a comparison of experiments where ERL-4221 was absent which had a shrinkage of 0.88 mils/inch and one containing 5.5 parts of ERL-4221 which exhibited a shrinkage of only 0.25 mils/inch. In addition surface appearance of complex hood scoop moldings judged visually after the application of a high gloss black paint were superior for formulations containing epoxy compounds. This evaluation technique is discussed below:

Surface evaluations of molded fiber reinforced plastic (FRP) parts with and without the epoxides was done two ways:
 1. Bendix Profilometer; and
 2. Visual observation;
  (a) unpainted hoods;
  (b) painted hoods.

Bendix Profilometer or microrecorder was used to determine the surface smoothness of 12"×12" panels molded from the various SMC formulations. A diamond stylus connected to the Bendix Profilometer passes over the surface of the panels, measuring the hills and valleys. These recorded surface variations are averaged to give the MCR reading (micro inches/inch) recorded in the report.

The visual observations were done on miniature automobile hood scoops molded from the SMC formulations. The hood scoop contained a number of ribs and bosses of varying width and depth. Examination of this molded hood allows one to visually assess the "sink" over the ribs and bosses which is a measure of shrinkage control. It also allows one to evaluate how the materials have flowed over the part and down "draws". Waviness or rippling and fiber pattern on the molding can be observed as well as porosity. These hood scoops were evaluated by a panel of 2-3 people as they came out of the mold and after painting with a gloss black finish. Ratings were assigned from 1-6, with the highest number being best. A + or − sign indicates slightly better or worse than the number assigned.

Tensile strength determinations showed no deliterious effect of the epoxy-based formulations over those without epoxy present. In some cases increases of up to about 20 percent in tensile strength were observed. Panels containing the epoxides were baked at 400° F. (204.5° C.) for 30 minutes and displayed reduced discoloration as evidence of increased thermal stability compared with a control material. These data are shown in Table VII.

TABLE VII
RESULTS OF MOLDING OF THE SMC FORMULATIONS OF TABLE VI

| Epoxy Compound | Amount | Molding Viscosity MM cps | Shrinkage Control mils/inch | Tensile Strength psi | Thermal[1] Discoloration | Visual Surface Evaluation[2] Painted Hood Scoop |
|---|---|---|---|---|---|---|
| None | — | 22.8 | 0.0 | 10,000 | 0 | 2 |
| UCC ERL-4221 | 2.75 | 23.2 | 0.0 | 11,000 | + | 3— |
| UCC ERL-4234 | 2.75 | 40.0 | 0.0 | 10,300 | + | 3+ |
| UCC ERL-4299 | 2.75 | 40.0 | 0.0 | 10,700 | + | 2+ |
| Shell Epon-828 | 2.75 | 37.6 | 0.0 | 11,800 | + | 2+ |
| Ashland Aroflint-607 | 2.75 | 37.6 | 0.0 | 10,500 | + | 3 |
| UCC FLEXOL EPO | 2.75 | 27.2 | +0.67 | 11,000 | — | 2+ |
| UCC FLEXOL EP-8 | 2.75 | 20.8 | +0.71 | 11,700 | — | 3 |
| UCC FLEXOL LOE | 2.75 | 20.8 | +0.40 | 10,400 | — | 3— |
| UCC ERL-4221 | 5.5 | 26.4 | +0.79 | 10,900 | 0 | 4 |
| UCC ERL-4234 | 5.5 | 34.4 | +0.75 | 12,000 | 0 | 3 |
| UCC ERL-4299 | 5.5 | 49.6 | +0.78 | 12,400 | 0 | 2+ |
| Shell Epon-828 | 5.5 | 23.2 | +0.81 | 11,800 | 0 | 4 |
| Ashland Aroflint-607 | 5.5 | 22.4 | +0.75 | 10,800 | 0 | 3— |
| FLEXOL EPO | 5.5 | 45.6 | +0.83 | 11,500 | 0 | 3— |
| FLEXOL EP-8 | 5.5 | 39.2 | +0.94 | 11,600 | 0 | 3— |
| FLEXOL LOE | 5.5 | 43.2 | +0.90 | 11,400 | —2 | 3 |

Flat panels (12" × 12") molded at 300° F./2 minutes/75 tons/450 g.

[1] After treating the molded panels (12" × 12") at 400° F. for 30 minutes the discoloration was observed as a function of thermal stability. 0 = control; + lighter than control; — slightly darker than control; —2 much darker than control
[2] Hood scoop molding 800 g/310° F./2 minutes/1000 psi painted with a gloss black and visually evaluated for surface. Lowest number — worst; highest number — best.

Table VIII depicts the reduction to practice of the compositions of this invention. Visual examination of the unpainted hood scoops molded from the epoxy formulations were superior to the control formula containing no epoxy. Similar formulas were repeated with another polyester resin and visual evaluation of the painted hood scoop moldings confirmed the initial observations.

The surface appearance of the molded parts from Experiment 2 were better than those from Experiment 1 and the parts from Experiment 3 were better than those from Experiment 4.

TABLE VIII
SMC FORMULATIONS (PARTS BY WEIGHT)

| | 1 | 2 | 3 | 4 |
|---|---|---|---|---|
| Freeman Stypol 40-2955 | 60 | 57 | — | — |
| Rockwell International NR-3929[1] | — | — | 52.25 | 55 |
| UCC LP-40A | 35 | 35 | 40 | 40 |
| UCC ERL-4221 | — | 3 | 2.75 | — |
| Styrene | 5 | 5 | 5 | 5 |
| Snowflake | 150 | 150 | 150 | 150 |
| Zinc Stearate | 4 | 4 | 2 | 2 |
| VR-3 | — | — | 2 | 2 |
| TBPB | 1.2 | 1.2 | 0.5 | 0.5 |
| PDO (50%) | — | — | 0.5 | 0.5 |
| USS Modifier M | 2.5 | 2.5 | — | — |
| Merck Marinco H | — | — | 2.4 | 2.4 |
| Ca(OH)₂ | — | — | 0.8 | 0.8 |
| OCF-951 (1") Wt. % | 30.2 | 30.2 | 27.9 | 26.9 |
| Molded 300° F./2 minutes/75 tons (12" × 12") | | | | |
| Shrinkage (mils/inch) | 0.46 | 0.10 | | |
| Tensile Strength, psi | 9960 | 9110 | | |
| Flex. Strength, psi | 16,026 | 21,140 | | |
| Notched Izod Impact ft-lbs/inch | 11.5 | 10.8 | | |
| Surface Appearance (Molded Hood Scoops) | 2 is better than 1 | | 3 is better than 4 | |

[1] Added an extra 110 ppm PBQ

Another series of sheet molding compound runs was made using a different structural unsaturated polyester resin, USS Polyester Divisions MR-13031 resin as a contrast with the polyester resin used in the above-described experiments. The formulations and surface appearance ratings on the painted hood scoops are given in Table IX. Again it is apparent that the presence of the epoxy compound (ERL-4221) improves the overall surface appearance.

TABLE IX
SMC EXPERIMENTS WITH ERL-4221 AND USS-13031 RESIN

| | | | | |
|---|---|---|---|---|
| USS 13031[1] | 65 | 62 | 60 | 65 |
| LP-40A | 28 | 28 | 28 | 28 |
| ERL-4221 | — | 3 | 6 | 6 |
| Snowflake | 142 | 142 | 142 | 142 |
| BAKELITE VR-3 | 2 | 2 | 2 | 2 |
| Zinc Stearate | 2 | 2 | 2 | 2 |
| TBPB | 0.75 | 0.75 | 0.75 | 0.75 |
| PDO (50%) | 1.5 | 1.5 | 1.5 | 1.5 |
| B Side[2] | 22.1 | 22.1 | 22.1 | 22.1 |
| OCF-951 1" Fibers. Wt. % | 27.1 | 27.2 | 26.9 | 28.0 |
| SMC-20-oz/sq. ft. | | | | |
| Molding Viscosity, MM cps - Brookfield HBT 5X/TF/5 rpm | 20.0 | 23.2 | 21.6 | 19.2 |
| Painted Hood Scoop - | | | | |
| Surface Appearance[3] | 2— | 3+ | 3+ | 3+ |
| Rating[4] | 3-3+ | — | — | 4 |

[1] An extra 100 ppm of parabenzoquinone was added to the resin
[2] Weight % - BAKELITE LP-85 50: Snowflake 42: PDI-1803 Pigment 3: Maglite A (MgO-Merck) 5 percent as a predispersion
[3] 800 g. 285° F./1000 psi/90 seconds/C-5 close
[4] 800 g. 300° F./1000 psi/90 seconds/C-5 close Other sheet molding compounds using EP-1404 epoxide was used. The formulation and the shrinkage thereof are shown in Table X.

TABLE X

| Run No. | 1 | 2 | 3 |
|---|---|---|---|
| Formulation | | | |
| Freeman Stypol 40-2955 | 65 | 65 | 65 |
| UCC LP-40A | 35 | 35 | 35 |
| EP 1404 | — | 3 | 6 |
| Snowflake | 150 | 150 | 150 |
| t-Butyl Perbenzoate | 1.5 | 1.5 | 1.5 |
| Zinc Stearate | 4 | 4 | 4 |
| USS Modifier M | 3 | 3 | 3 |
| ¼″ Glass (wt. %) | 10 | 10 | 10 |
| Molding Viscosity, MM cps | 35 | 33 | 34 |
| Shrinkage, mils/inch | 1.04 | 0.8 | 0.3 |
| Molding parameters | 2 mins/300° F./75 tons | | |

BMC TRANSFER MOLDING EXPERIMENTS

Many rippling and waviness problems in both SMC and BMC parts occur near the edge of the molding (shear edges) after some significant compound flow. To simulate this, experiments were carried out upon a transfer mold. In this type of press a charge is rammed into the mold after closure. The mold is complex and designed to study flow and to make moldings for ASTM tests. At the end of the flow area on the 4-inch disc, ripples are often times observed. The formulations given in Table XI were molded on this press and surface measurements of the last 1–1.5 inches of the flow in the 4-inch disc measured in the molded part using a Bendix Profilometer were taken. Both epoxy compounds examined (ERL-4221 and EPON-828) afforded greatly improved surface smoothness in these regions.

TABLE XI

TRANSFER MOLDING FORMULATIONS

| | 1 | 2 | 3 | 4 | 5 |
|---|---|---|---|---|---|
| Rockwell International NR-3929 | 55 | 55 | 55 | 55 | 55 |
| LP-40 | 40 | 40 | 40 | 40 | 40 |
| Styrene | 5 | 5 | 5 | 5 | 5 |
| ERL-4221 | — | 3 | 6 | — | — |
| Epon-828 | — | — | — | 3 | 6 |
| Snowflake | 180 | 180 | 180 | 180 | 180 |
| TBPB | 1.5 | 1.5 | 1.5 | 1.5 | 1.5 |
| BAKELITE VR-3 | 2 | 2 | 2 | 2 | 2 |
| Zinc Stearate | 2 | 2 | 2 | 2 | 2 |
| Parabenzoquinone | 0.01 | 0.01 | 0.01 | 0.01 | 0.01 |
| Merck Marinco H | 2.4 | 2.4 | 2.4 | 2.4 | 2.4 |
| Ca(OH)$_2$ | 0.8 | 0.8 | 0.8 | 0.8 | 0.8 |
| Fiberglass (¼″), Wt. % | 20 | 20 | 20 | 20 | 20 |
| MCR* | 409 | 126 | 68 | 61 | 43 |
| Tensile Strength psi | 4540 | 5600 | 4675 | 6067 | 5185 |

*Taken on last 1 to 1½ inches of 4″ disc. Bendix Profilometer micro inches/inch. Lowest number is the smoothest.

BMC COMPRESSION MOLDING EXPERIMENTS

BMC experiments containing low profile additives LP-100 and LP-60 were run incorporating epoxy compounds at 150 phr (parts per hundred of resin) of filler and 15 weight percent fiber glass reinforcement. These formulations, as well as shrinkage control and relative pigmentability ratings are presented in Table XII. These experiments demonstrate improved shrinkage control with all classes of epoxy resins tried. The pigmentation rating is 1=best, 3=worst.

TABLE XII

EXPERIMENTS WITH LP-100 AND LP-60

| | 1 | 2 | 3 | 4 | 5 | 6 | 7 | 8 | 9 | 10 | 11 | 12 | 13 | CONTROL 13 |
|---|---|---|---|---|---|---|---|---|---|---|---|---|---|---|
| Formulation | | | | | | | | | | | | | | |
| 3929 (Rockwell Int.) | 60 | — | — | — | — | — | — | — | — | — | — | — | — | — |
| LP-60 | 35 | — | — | — | — | — | — | — | — | — | — | — | — | — |
| LP-100 | — | — | — | — | — | — | — | 35 | — | — | — | — | — | — |
| Styrene | 5 | — | — | — | — | — | — | — | — | — | — | — | — | — |
| ERL-4221 | — | 3 | 5 | — | — | — | — | 3 | 6 | — | — | — | — | — |
| Aroflint 607 | — | — | — | 3 | 6 | — | — | — | — | 3 | 6 | — | — | — |
| FLEXOL plasticizer EPO | — | — | — | — | — | 3 | 6 | — | — | — | — | 3 | 6 | — |
| Snowflake | 150 | — | — | — | — | — | — | — | — | — | — | — | — | — |
| TBPB | 1.0 | — | — | — | — | — | — | — | — | — | — | — | — | — |
| Zinc Stearate | 4 | — | — | — | — | — | — | — | — | — | — | — | — | — |
| BAKELITE LP-100 Part B (50% in Styrene) | — | — | — | — | — | — | — | 3 | — | 43 | — | — | — | — |
| CM-2015 Pigment | 7 | — | — | — | — | — | — | — | — | — | — | — | — | — |
| Modifier M | 2.4 | — | — | — | — | — | — | — | — | — | — | — | — | — |
| JM 308-A, Wt. % ¼″ fibers | 15 | — | — | — | — | — | — | — | — | — | — | — | — | — |
| Viscosity, cps | | | | | | | | | | | | | | |
| Initial | — | — | — | — | Exuded | — | — | — | — | — | — | — | — | — |
| 1 Day, MM | 4.0 | 1.6 | 1.2 | 5.6 | Badly not Molded | 40.8 | 36.6 | 45.6 | 40.0 | 45.6 | 37.6 | | | 52.8 |
| 2 Days, MM | 10.0 | 6.0 | 4.4 | 14.4 | | — | — | — | — | — | — | | | — |
| 3 Days, MM | — | — | — | — | | | | | | | | | | |
| 4 Days, MM | — | — | — | — | | | | | | | | | | |
| 5 Days, MM | — | — | — | — | | | | | | | | | | |
| 6 Days, MM | — | 17.0 | 16 | — | | | | | | | | | | |
| Physical Properties | | | | | | | | | | | | | | |
| Shrink, mils/inch | 0.67 | 0.69 | 1.04 | 0 | | 0.5 | 0 | 0 | 0 | 0 | 0 | | | 1.8 |
| Pigmentation | 3 | 3 | 2 | 3 | | 2 | 2 | 2 | 3 | 2 | 1 | | | 1-2 |

CONTROL EXPERIMENTS

Control Experiments were run in which the thermoplastic additive was excluded from the formulation and only the epoxy compound was used to control shrinkage. The formulations are shown in Table XIII. These warped badly, indicating little or no direct influence of the epoxy alone to control shrinkage.

TABLE XIII

EXPERIMENTS EXCLUDING LOW PROFILE ADDITIVES

|  | 1 | 2 | 3 |
|---|---|---|---|
| Rockwell International NR-3929 | 91.7 | — | — |
| Styrene | 8.3 | — | — |
| ERL-4221 | 20 | — | — |
| Epon-828 | — | 20 | — |
| FLEXOL EPO | — | — | 20 |
| Snowflake | 250 | — | — |
| VR-3 | 3.3 | — | — |
| Zinc Stearate | 3.3 | — | — |
| TBPB | 2.5 | — | — |
| Modifier M | 5.0 | — | — |
| ¼" Fiberglass (Wt. %) | 10 | — | — |
| 5 Day Viscosity, MM cps | 20 | 10 | Bad Exudation |

Molding Conditions
300° F./2 minutes/75 tons
All panels warped badly

In order to demonstrate the applicability of the invention to unthickened formulations surface measurements were taken on the four formulations shown in Table XIV. The Bendix Profilometer test shows lower MCR numbers for formulations containing epoxy compounds than for the first which contained no epoxy compound (Control 1).

TABLE XIV

|  | CONTROL 1 | RUN 2 | RUN 3 | RUN 4 |
|---|---|---|---|---|
| NR-3529 | 368.5 | — | — | — |
| LP-40A | 105 | — | — | — |
| Styrene | 26.5 | — | — | — |
| 0.5% TBC in Styrene | 1.0 | — | — | — |
| Zelec UN | 6.5 | — | — | — |
| Snowflake | 580.0 | — | — | — |
| PDO (50%) | 7.0 | — | — | — |
| Zinc Stearate | — | — | —. | 15 |
| Flexol EP-8 | — | 15 | 30 | — |
| Flexol EPO | — | — | — | 30 |
| MCR | 158.0 | 134 | 83 | 29 |
| Glass Mat (OCF-8601) Wt. % | 30 | 30 | 30 | 30 |

Molding conditions 260° F. (127° C.) for 2.5 minutes

Critical shrinkage experiments were also carried out on unthickened compositions using 10% thermoplastic low profile additive respectively. The formulations containing epoxy compounds were superior to Control 1a as demonstrated in Table XV.

TABLE XV

|  | CONTROL 1a | RUN 2a | RUN 3a |
|---|---|---|---|
| NR-3929 | 65 | 65 | 65 |
| LP-90 | 25 | 25 | 25 |
| Styrene | 10 | 10 | 10 |
| ERL-4221 | — | 5 | — |
| EPO | — | — | 5 |
| Snowflake | 150 | 150 | 150 |
| Zinc Stearate | 2 | 2 | 2 |
| VR-3 | 2 | 2 | 2 |
| TBPB | 1.5 | 1.5 | 1.5 |
| Glass Wt. % | 110 | 10 | 10 |
| Shrinkage mils/inch | 0.31 | 0.21 | 0.0 |

EXPERIMENT AND CONTROL EXPERIMENTS

In order to distinguish the low profile additive compositions of the present invention from the compositions disclosed in U.S. Pat. No. 3,997,627 (Ichimura et al.), a series of experiments were conducted in which three molding compositions were cured into molded panels and tested for shrinkage control. The three molding compositions contained respectively: (1) no epoxy compound (Control A); (2) an epoxy compound having reactive unsaturation as disclosed in Ichimura et al. (Control B) and (3) an epoxy compound essentially free of reactive unsaturation as required in the present invention (Example 1). The molding formulations and the results of the testing are given in Table XVI below.

TABLE XVI

CRITICAL SHRINKAGE CONTROL TEST FORMULATIONS

|  | CONTROL A | CONTROL B | 1 |
|---|---|---|---|
| USS-13047 | 325 | 325 | 325 |
| LP-40A | 175 | 175 | 175 |
| FLEXOL EP-8 | — | — | 15 |
| Glycidyl Methacrylate | — | 15 | — |
| Camel Wite | 850 | 850 | 850 |
| Zinc Stearate | 20 | 20 | 20 |
| PDI 1803 | 7.5 | 7.5 | 7.5 |
| TBPB | 7.5 | 7.5 | 7.5 |
| Modifier M | 12.0 | 12.0 | 12.0 |
| Paste Sample Removed | 175 | 175 | 175 |
| JM 308-A Fibers | 136 | 137 | 137 |
| Shrinkage, mils/inch | 0.35 | 0.71 | +0.02 |

Molding conditions: allowed to thicken overnight: molded 450 gram charges into 12" × 12" × ⅛" panels at 300° F./3 minutes/75 tons pressure.

The results of Table XVI clearly demonstrate that the low profile additive compositions of the present invention containing an epoxy compound essentially free of reactive unsaturation exhibit improved shrinkage control in comparison with compositions disclosed in U.S. Pat. No. 3,997,627 (Ichimura et al.) which do not contain an epoxy compound essentially free of reactive unsaturation. In fact, greater shrinkage (mils/inch) is exhibited in Control B using glycidyl methacrylate than in Control A having no epoxy compound present therein.

Although the invention has been described in its preferred forms with a certain degree of particularity, it is understood that the present disclosure has been made only by way of example, and that numerous changes can be made without departing from the spirit of the scope of the invention.

We claim:

1. In a low profile additive composition containing a thermosetting unsaturated polyester, a thermoplastic polymer additive to control shrinkage, and an ethylenically unsaturated polymerizable monomer suitable for use in molding applications, the improvement which comprises incorporating into said mixture an epoxy compound having at least one 1,2-epoxy group per molecule, said epoxy compound being essentially free of reactive unsaturation.

2. Composition claimed in claim 1 wherein the epoxy compound has the structure

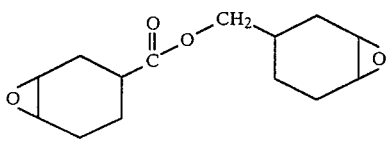

3,4-epoxycyclohexylmethyl 3,4-epoxycyclohexane carboxylate.

3. Composition claimed in claim 1 wherein the epoxy compound has the formula

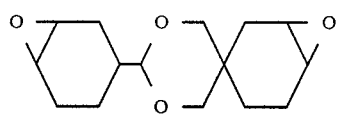

3-(3,4-epoxycyclohexane)-8,9-epoxy-2,4-dioxaspiro [5.5]-undecane.

4. Composition claimed in claim 1 wherein the epoxy compound has the formula:

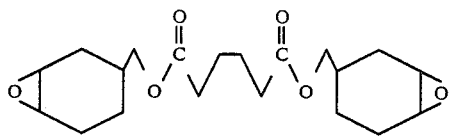

bis(3,4-epoxy-cyclohexylmethyl)adipate.

5. Composition claimed in claim 1 wherein the epoxy compound has the structure:

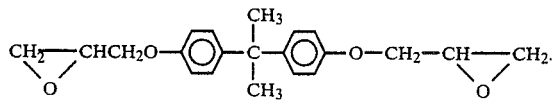

6. Composition claimed in claim 1 wherein the epoxy compound has the structure:

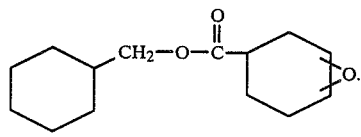

7. Composition claimed in claim 1 wherein the epoxy compound is epoxidized pentaerythritol tetratallate.

8. Composition claimed in claim 1 wherein the epoxy compound is epoxidized soy bean oil.

9. Composition claimed in claim 1 wherein the epoxy compound is octyl epoxytallate.

10. Composition claimed in claim 1 wherein the epoxy compound is epoxidized linseed oil.

11. Composition claimed in claim 1 containing a thickening amount of a chemically active thickening agent.

12. Composition claimed in claim 11 wherein the thickening agent is magnesium oxide.

13. Composition claimed in claim 1 wherein the low profile additive is a polyvinyl acetate.

14. Composition claimed in claim 11 containing a carboxylated polyvinyl acetate low profile additive.

15. Composition claimed in claim 1 containing a reinforcing filler.

16. Composition claimed in claim 15 wherein the reinforcing filler is glass fiber.

17. Composition claimed in claim 1 containing a rubber or elastomer.

18. A molded article produced from the composition of claim 1.

19. In a low profile additive composition containing a thermosetting unsaturated polyester, a thermoplastic polymer additive to control shrinkage, and an ethylenically unsaturated polymerizable monomer suitable for use in molding applications, the improvement which comprises incorporating into said mixture an epoxy compound having at least one 1,2-epoxy group per molecule selected from

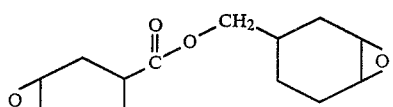

3,4-epoxycyclohexylmethyl 3,4-epoxycyclohexane carboxylate.

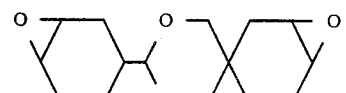

3-(3,4-epoxycyclohexane)-8,9-epoxy-2,4-dioxaspiro [5.5]-undecane.

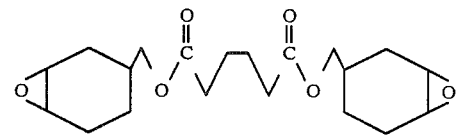

bis(3,4-epoxy-cyclohexylmethyl)adipate.

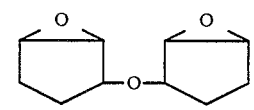

bis(2,3-epoxycyclopentyl)ether.

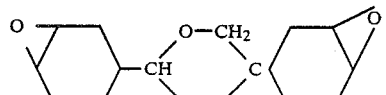

2-(3,4-epoxycyclohexyl-5,5-spiro)-(3,4 epoxy)cyclohexane-m-dioxane, and

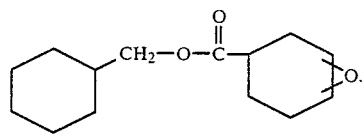

20. In a low profile additive composition containing a thermosetting unsaturated polyester, a thermoplastic polymer additive to control shrinkage, and an ethylenically unsaturated polymerizable monomer suitable for use in molding applications, the improvement which comprises incorporating into said mixture an epoxy compound having at least one 1,2-epoxy group per molecule selected from compound having at least one 1,2-epoxy group per molecule and having the formula

wherein n is an integer representing the number of repeating units and has a value of 0 to about 10 and Z is an arylene radical having 6 to about 20 carbons.

22. In a low profile additive composition containing a thermosetting unsaturated polyester, a thermoplastic polymer additive to control shrinkage, and an ethylenically unsaturated polymerizable monomer suitable for use in molding applications, the improvement which comprises incorporating into said mixture an epoxy compound having at least one 1,2-epoxy group per molecule selected from epoxidized pentaerythritol tetratallate, epoxidized soy bean oil, octyl epoxytallate and epoxidized linseed oil.

23. A composition for use in molding applications comprising a thermoplastic polymer low profile additive, an ethylenically unsaturated polymerizable monomer and an epoxy compound having at least one 1,2-epoxy group per molecule, said epoxy compound being essentially free of reactive unsaturation.

* * * * *

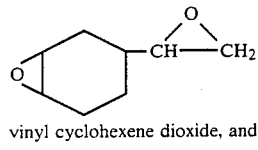

vinyl cyclohexene dioxide, and

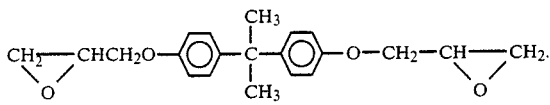

21. In a low profile additive composition containing a thermosetting unsaturated polyester, a thermoplastic polymer additive to control shrinkage, and an ethylenically unsaturated polymerizable monomer suitable for use in molding applications, the improvement which comprises incorporating into said mixture an epoxy

UNITED STATES PATENT AND TRADEMARK OFFICE
CERTIFICATE OF CORRECTION

PATENT NO. : 4,525,498

DATED : June 25, 1985

INVENTOR(S) : Atkins et al

It is certified that error appears in the above-identified patent and that said Letters Patent is hereby corrected as shown below:

Delete Table XII, columns 19 and 20, and substitute therefor the following Table XII:

TABLE XII

| | \multicolumn{13}{c}{EXPERIMENTS WITH LP-100 AND LP-60} | CONTROL |
|---|---|---|---|---|---|---|---|---|---|---|---|---|---|---|
| | 1 | 2 | 3 | 4 | 5 | 6 | 7 | 8 | 9 | 10 | 11 | 12 | 13 | 13 |
| Formulation | | | | | | | | | | | | | | |
| 3929 (Rockwell Int.) | 60 ——————————————————————————————————— |
| LP-60 | 35 ——————————————— | – | – | – | – | – | – | – |
| LP-100 | – | – | – | – | – | – | – | 35 ——————————————— |
| Styrene | 5 ——————————————————————————————————— |
| ERL-4221 | – | 3 | 5 | – | – | – | – | 3 | 6 | – | – | – | – | – |
| Aroflint 607 | – | – | – | 3 | 6 | – | – | – | – | 3 | 6 | – | – | – |
| FLEXOL plasticizer EPO | – | – | – | – | – | 3 | 6 | – | – | – | – | 3 | 6 | – |
| Snowflake | 150 —————————————————————————————————— |
| TBPB | 1.0 —————————————————————————————————— |
| Zinc Stearate | 4 ———————————————————————————————————— |
| BAKELITE LP-100 Part B (50% in Styrene) | – | – | – | – | – | – | – | 3 ——————————————— |
| CM-2015 Pigment | 7 ———————————————————————————————————— |
| Modifier M | 2.4 —————————————————————————————————— |
| JM 308-A, Wt. % 1" fibers | 15 ———————————————————————————————————— |
| Viscosity, cps | | | | | | | | | | | | | | |
| Initial | – | – | – | – | Exuded | | | – | – | – | – | – | – | – |
| 1 Day, MM | 4.0 | 1.6 | 1.2 | 5.6 | Badly not | | | 40.8 | 36.8 | 45.6 | 40.0 | 45.6 | 37.6 | 52.8 |
| 2 Days, MM | 10.0 | 6.0 | 4.4 | 14.4 | Molded | | | – | – | – | – | – | – | – |
| 3 Days, MM | – | – | – | – | | | | – | – | – | – | – | – | – |
| 4 Days, MM | – | – | – | – | | | | – | – | – | – | – | – | – |
| 5 Days, MM | – | – | – | – | | | | – | – | – | – | – | – | – |
| 6 Days, MM | – | 17.0 | 16 | – | | | | – | – | – | – | – | – | – |
| Physical Properties | | | | | | | | | | | | | | |
| Shrink, mils/inch | 0.67 | 0.69 | 1.04 | 0 | | | | 0.5 | 0 | 0 | 0 | 0 | 0 | 1.08 |
| Pigmentation | 3 | 3 | 2 | 3 | | | | 2 | 2 | 2 | 3 | 2 | 1 | 1-2 |

UNITED STATES PATENT AND TRADEMARK OFFICE
CERTIFICATE OF CORRECTION

PATENT NO. : 4,525,498
DATED : June 25, 1985
INVENTOR(S) : Atkins et al.

It is certified that error appears in the above-identified patent and that said Letters Patent is hereby corrected as shown below:

Delete Table XIII, column 21 and substitute therefor the following Table XIII:

| TABLE XIII | | | |
|---|---|---|---|
| EXPERIMENTS EXCLUDING LOW PROFILE ADDITIVES | | | |
| | 1 | 2 | 3 |
| Rockwell International NR-3929 | 91.7 | — | — |
| Styrene | 8.3 | — | — |
| ERL-4221 | 20 | — | — |
| Epon-828 | — | 20 | — |
| FLEXOL EPO | — | — | 20 |
| Snowflake | 250 | — | — |
| VR-3 | 3.3 | — | — |
| Zinc Stearate | 3.3 | — | — |
| TBPB | 2.5 | — | — |
| Modifier M | 5.0 | — | — |
| 1" Fiberglass (Wt. %) | 10 | — | — |
| 5 Day Viscosity, MM cps | 20 | 10 | Bad Exudation |
| Molding Conditions 300° F./2 minutes/75 tons | | | |
| All panels warped badly | | | |

UNITED STATES PATENT AND TRADEMARK OFFICE
CERTIFICATE OF CORRECTION

PATENT NO. : 4,525,498
DATED : June 25, 1985
INVENTOR(S) : Atkins et al.

It is certified that error appears in the above-identified patent and that said Letters Patent is hereby corrected as shown below:

Delete Table XIV, column 21 and substitute therefor the following Table XIV:

TABLE XIV

| | CONTROL 1 | RUN 2 | RUN 3 | RUN 4 |
|---|---|---|---|---|
| NR-3529 | 368.5 | | | |
| LP-40A | 105 | | | |
| Styrene | 26.5 | | | |
| 0.5% TBC in Styrene | 1.0 | | | |
| Zelec UN | 6.5 | | | |
| Snowflake | 580.0 | | | |
| PDO (50%) | 7.0 | — | — | — |
| Zinc Stearate | — | — | — | 15 |
| Flexol EP-8 | — | 15 | 30 | — |
| Flexol EPO | — | — | — | 30 |
| MCR | 158.0 | 134 | 83 | 29 |
| Glass Mat (OCF-8601) Wt. % | 30 | 30 | 30 | 30 |

Molding conditions 260° F. (127° C.) for 2.5 minutes

Signed and Sealed this

Tenth Day of December 1985

[SEAL]

Attest:

DONALD J. QUIGG

Attesting Officer     Commissioner of Patents and Trademarks